US012797860B2

(12) United States Patent
Salamanca Poblete et al.

(10) Patent No.: US 12,797,860 B2
(45) Date of Patent: Nov. 17, 2026

(54) SYSTEM AND METHOD FOR CHANGING A MILL LINER, CONFIGURED TO ALLOW THE FULLY AUTOMATED AND ROBOTIC MANIPULATION OF THE METHOD

(71) Applicant: MI ROBOTIC SOLUTIONS S.A., Santiago (CL)

(72) Inventors: Hugo Cesar Salamanca Poblete, Santiago (CL); Luis Alejandro Baeza Ramirez, Santiago (CL)

(73) Assignee: MI ROBOTIC SOLUTIONS S.A., Santiago (CL)

( * ) Notice: Subject to any disclaimer, the term of this patent is extended or adjusted under 35 U.S.C. 154(b) by 1099 days.

(21) Appl. No.: 17/639,935

(22) PCT Filed: Sep. 3, 2019

(86) PCT No.: PCT/CL2019/050082
§ 371 (c)(1),
(2) Date: Oct. 14, 2022

(87) PCT Pub. No.: WO2021/042219
PCT Pub. Date: Mar. 11, 2021

(65) Prior Publication Data
US 2023/0064546 A1 Mar. 2, 2023

(51) Int. Cl.
*B02C 17/22* (2006.01)
*B25J 9/00* (2006.01)
(Continued)

(52) U.S. Cl.
CPC ............. *B02C 17/22* (2013.01); *B25J 9/0084* (2013.01); *B25J 9/02* (2013.01); *B25J 11/005* (2013.01)

(58) Field of Classification Search
CPC .. B02C 17/22; B25J 9/0084; B25J 9/02; B25J 11/005; B25J 9/0009; B25J 11/00; B23P 19/04; B23P 19/06
See application file for complete search history.

(56) References Cited

U.S. PATENT DOCUMENTS 4,885,836 A * 12/1989 Bonomi ................. B25J 9/0084 29/818
7,746,018 B2 * 6/2010 Salamanca ............... B25J 11/00 318/568.11
(Continued)

FOREIGN PATENT DOCUMENTS

CL 199800559 A1 3/1999
CL 49044 B1 4/2013
(Continued)

OTHER PUBLICATIONS

International Search Report for Application No. PCT/CL2019/050082 , mailing date Jan. 17, 2020.
(Continued)

*Primary Examiner* — Sihar A Karwan
(74) *Attorney, Agent, or Firm* — Gottlieb, Rackman & Reisman, PC

(57) ABSTRACT

The invention relates to a system and method for the robotic and automated, coordinated, collaborative changing of mill liners, the configuration thereof allowing the full robotic and automated manipulation of the method, by means of a remote command entered by an operator by means of a processor of a control system. The system of the invention comprises: at least one robotic manipulator (2) located outside of the mill; at least one robotic manipulator (3) located inside the mill; a control system; and a series of tools that are taken and manipulated automatically by the robotic manipulators (2, 3), such that the control system sends a command to operate the at least one external manipulator (2)
(Continued)

and the at least one internal manipulator (3) to carry out the steps of changing at least one liner of the mill in a coordinated manner with collaboration between at least the two robotic manipulators.

9 Claims, 6 Drawing Sheets

(51) Int. Cl.
*B25J 9/02* (2006.01)
*B25J 11/00* (2006.01)

(56) References Cited

U.S. PATENT DOCUMENTS

| | | | | |
|---|---|---|---|---|
| 8,886,358 | B2 * | 11/2014 | Sato | B25J 9/1661 700/262 |
| 9,126,700 | B2 * | 9/2015 | Ozkul | G03B 15/006 |
| 10,019,658 | B2 * | 7/2018 | Wang | G06V 40/20 |
| 10,150,213 | B1 * | 12/2018 | Linnell | B25J 9/1679 |
| 10,262,403 | B2 * | 4/2019 | Kim | B64G 1/242 |
| 10,864,640 | B1 * | 12/2020 | Innes | B08B 9/0933 |
| 11,884,377 | B2 * | 1/2024 | Oberoi | B64F 5/10 |
| 2003/0000063 | A1 * | 1/2003 | Tsegga | F16B 19/05 29/252 |
| 2006/0143890 | A1 * | 7/2006 | Linnemann | B25J 15/0061 29/33 R |
| 2007/0149098 | A1 * | 6/2007 | Salamanca | B02C 17/205 414/737 |
| 2007/0180678 | A1 * | 8/2007 | Salamanca | B02C 17/00 29/426.4 |
| 2010/0057254 | A1 * | 3/2010 | Salamanca | B25J 11/00 414/730 |
| 2010/0071192 | A1 * | 3/2010 | Sarh | B25B 11/002 269/8 |
| 2010/0217437 | A1 * | 8/2010 | Sarh | B64F 5/10 700/248 |
| 2012/0029812 | A1 * | 2/2012 | Altwaijry | G06Q 10/04 701/531 |
| 2012/0215348 | A1 * | 8/2012 | Skrinde | B25J 9/163 701/2 |
| 2014/0209232 | A1 * | 7/2014 | Havar | B29D 99/001 156/92 |
| 2014/0367519 | A1 * | 12/2014 | Goehlich | B22F 7/062 244/119 |
| 2015/0082708 | A1 * | 3/2015 | Eilken | B64C 1/14 49/477.1 |
| 2015/0336271 | A1 * | 11/2015 | Spicer | B25J 9/1687 228/9 |
| 2017/0173746 | A1 * | 6/2017 | Apold | B23P 19/06 |
| 2017/0239722 | A1 * | 8/2017 | Goehlich | B33Y 50/02 |
| 2018/0362270 | A1 * | 12/2018 | Clucas | G05B 19/4182 |
| 2019/0278295 | A1 * | 9/2019 | Matsuno | B25J 9/0084 |
| 2020/0198071 | A1 * | 6/2020 | Oberoi | B64F 5/10 |
| 2021/0237903 | A1 * | 8/2021 | Coulier | B64F 5/10 |
| 2022/0062915 | A1 * | 3/2022 | Salamanca Poblete | B23P 19/04 |

FOREIGN PATENT DOCUMENTS

| | | | |
|---|---|---|---|
| EP | 3478585 | | 4/2020 |
| JP | 4020179 | B2 | 12/2007 |
| KR | 10-1183105 | B1 | 9/2012 |
| KR | 10-1647021 | | 8/2016 |
| KR | 10-1681178 | B1 | 11/2016 |
| KR | 10-1855652 | B1 | 6/2018 |
| KR | 10-2005620 | | 7/2019 |
| KR | 10-2021-0064672 | | 6/2021 |
| WO | 2015172262 | A1 | 11/2015 |

OTHER PUBLICATIONS

Written Opinion for Application No. PCT/CL2019/050082, mailing date Jan. 17, 2020.

* cited by examiner

SYSTEM AND METHOD FOR CHANGING A MILL LINER, CONFIGURED TO ALLOW THE FULLY AUTOMATED AND ROBOTIC MANIPULATION OF THE METHOD

FIELD OF THE INVENTION

The present invention is comprised among equipment associated with mills for ore grinding in the mining industry; it particularly relates to replacing wear elements, such as mill liners or shields.

The invention preferably relates to an automated system and method for changing mill liners for grinding ore, comprising at least one robotic manipulator, at least one tool for being used in the operation of changing a liner disposed on the outside of the mill casing, and at least one anthropomorphic robotic manipulator with at least one tool for being used in the operation of changing said liner located inside the mill, wherein the operation of said robotic manipulators comprises giving a remote command by means of a processor of a control system for giving a logical sequence command based on a specified location of a liner to be changed or removed, in such a manner that the two anthropomorphic robotic manipulators position the tools in said commanded location in order to, as a whole, loosen, retain, take out, and replace the liner automatically from said commanded location from the surface of the mill casing.

The configuration of the system and method of the present invention allows the degree of freedom of movement of said anthropomorphic robotic manipulators, as well as the configuration of the tools used in the process to allow a remote, precise, and automated manipulation of the liners to be removed, regardless of the millimetric variations in movement which the mill may present, thereby increasing system efficacy, preventing nuts, washers, bolts, and/or liners from falling and from also being manipulated by operators.

The fact that the system is configured by anthropomorphic robotic manipulators allows either different movements or else different movements in different positions or directions to be performed, which successfully orient the tools used for changing liners depending on the point where the liner is taken; it allows the tool to be moved to different working points; and/or it allows the entire robotic manipulator to be rotated to different positions both inside and outside of the mill to access the different positions where a changing of liners is required.

BACKGROUND OF THE INVENTION

Grinding is a process which allows reducing size of the ore used in ore concentration processes, for which mills comprising an inner surface lined by liners or shields of a different type and shape according to their location on the inner surface of the mill, are used.

Liners are subjected to constant wear due to the impact of the ore and grinding means thereon, so they must be changed periodically.

Liners are usually changed using remotely controlled hydraulic manipulation equipment which requires operators to be both inside and outside the mill to help in positioning and guiding the liners, with this being a high-risk process for the staff intervening in the changing operation, as well as incurring a great deal of time associated with the maintenance operation.

The method for changing liners in the mill requires the mill to be rotated several times, which entails a lockout-tagout method for motors moving the mill, reducing effective working times, despite the liner manipulators being disposed inside the mill at all times during this operation.

To change liners inside the mill, there is furthermore a need to perform a series of preparatory works including among them:

- Coordinating with operating staff (halting the mill).
- Coordinating access area cleaning and set up.
- Coordinating an overhead crane to move smaller equipment.
- Providing auxiliary support elements, safety rope, ladders, etc., in the area.
- Determining the liners to be changed.
- Stocking new liners.
- Logistics for supplying new liners and removing used liners.

The process of changing inner liners of mills requires carrying out a series of operations such as:

- Preparation and setting up the area which involves halting the mill, moving the tools and equipment to be used to the area (tools for knocking out bolts, tool for cutting nuts, tool for applying torque on bolts, etc).
- Access to the inlet opening of the mill where the "feeding chute" and smaller elements are removed, which involves clearing the area to access the inside of the mill, to then move these elements to an area set up for temporary storage.
- Installation of liner manipulators which requires the coordination of a number of staff members and a rigorous operation to introduce the manipulator into the mill as well as the location of the staff outside the mill with the tools needed for making the change (through the span of the equipment and small access space).
- Knocking out bolts, an operation that must be performed from outside the mill by staff and equipment for cutting nuts and/or removing nuts and knocking out bolts, where these bolts generally fall into the mill.
- Disassembly of worn liners: Once the bolts have fallen into the mill, worn liners are pushed using equipment for knocking out bolts, and they fall into the mill. If needed, "torching" by means of oxy-fuel cutting (thermal cutting) of the fused joints between liners (liners stuck together as a result of "internal forging" and high impact pressures) must be performed additionally and prior to disassembly.
- Removal of used liners, performed by means of a liner manipulator mounted at the end of an extended beam, allowing the liners that fell into the mill to be loaded and deposited one-by-one in a movable carriage which takes said liners out of the mill.
- Installation of new liners, in which different types of liners are supplied from outside the mill on the movable carriage of the extended beam; this operation is performed according to the defined maintenance strategy in which the maintenance staff utilise the bolt projections going through the mantle to provide the initial fixing tightness to the liner.
- Rotations of the mill, which allow setting up different inner regions to repeat the new liner removal and installation process.
- Application of torque on bolts, in which the new liners are usually installed directly on the inner surface of the mill, and then the clamping bolts are inserted manually, with a part of the bolt projecting outwardly from the mantle; this bolt projection is used to secure the liner with a nut/cup washer on the outside of the mantle. This nut is tightened under a controlled torque, which secures the fixing of the liner over time, at least until the subsequent halting for maintenance.

Re-installation of the feeding chute, in which once the new liners are located inside the mill, the liner manipulator is removed, and the feeding chute is installed again.

The methods and equipment used in the art for the liner changing process have a series of drawbacks and problems impacting production, as well as the occupational health and safety of the staff.

With the equipment and methods used today, the liner changing time lasts for several days, in the order of 96 hours on average. A 40-foot mill has in the order of 540 wear elements therein which must be changed, which elements may weigh in total over 35 tonnes. It is estimated that the changing of liners is performed at a speed of 5 to 6 liners per hour, which reduces mill availability. The entire production of the plant is halted while maintenance lasts.

The main activities influencing the enormous amounts of time lost in performing the maintenance task of replacing liners are related to the loosening and knocking out of clamping bolts, the actual removal of the liners, and the installation of new liners. The low speed of the hydraulic oil equipment used today in the art that is in the order of 1 to 2 rpm prevents said equipment from being more efficient in the time used for performing the maintenance task.

Moreover, in practical terms, as regards maintenance, a weak fixing of liners will cause the loosening thereof, favouring pulp leakages, and therefore contamination leaking from the mill to the outside, and it will also cause liners to fall, and therefore unscheduled halting and production loss.

The current method involves the staff going into the mill, as well as being located outside the mill, which is intrinsically risky, working at height, and being exposed to the possibility of ore, grinding balls, or manual tools falling from the mill itself, the balls exploding, among others.

The maintenance staff must intervene in the handling of the liners in order to change said liners, which is very physically demanding and involves the risks of getting hit or trapped while removing and inserting liners.

A series of operators located both outside and inside the mill are normally used to perform the method for changing liners, wherein the method involves direct manipulation by operators with tools for cutting, welding, and/or removing nuts on the outside of the mill, for which purpose said operators are usually located on platforms at great heights, where they have to manipulate said large sized and heavy tools to perform said operation; furthermore, operators must also remove the washers and seals, to then push the bolts into the mill so as to loosen the liner from the inner wall of the mill. Then the liners usually fall into the mill, for which purpose an operator must engage the liner through auxiliary means, such as hooks or claws which are disposed in the liners for being coupled to liner manipulator equipment.

Conventional hydraulic liner manipulators used today in the art manipulate and control liners by way of remote control. Additionally, operation with the current machine requires constant interaction and collaboration among the maintenance staff for taking, guiding, and releasing the liner. Moreover, the visibility of the machine operator and of the maintenance staff is very low inside the mill, which may lead to a lack of coordination. All these activities involve a high risk, since the machine may hit against operators or operators may be hit by liners, situations that may be fatal should they occur.

All these tasks for changing a liner in mills require the direct intervention of the operators when executing each of the steps, whether it is by directly manipulating liners, bolts, nuts, washers, and/or seal, as well as also the auxiliary tools which are required for and/or support said task, which necessarily exposes operators to possible accidents because large sized and heavy elements and equipment must be manipulated. The operation performed as it is performed today requires a great deal of time for the changing process, reducing process efficiency.

A series of current efforts have been made to reduce liner changing times and the risks to which the operators intervening in the change are exposed, as well as to successfully reduce the times involved, such as for example, national application 199800559 (CODELCO), with publication date 12 Mar. 1999, describes a machine for simultaneously changing the inner liner of the covers and the mantle of the cylinder of a SAG mill, consisting of two arms or a dual manipulator forming a mobile structure which is inserted into the mill.

Moreover, national application 2642-2005 (MI ROBOTIC SOLUTIONS S.A.), with publication date 1 Jun. 2007 and corresponding to National Registration 49044, describes a robot-assisted method for the process of removing bolts from SAG mills, which method in turn comprises providing a robotic arm with at least 5 degrees of freedom, taking a nut cutting tool from a tool carrier rack, cutting or loosening the nut, and taking a tool for removing bolts to knock a securing bolt out of the mill.

Patent application WO2018/157201 (RUSSEL MINERAL EQUIPMENT PTY), published on Jul. 9, 2018, describes a method of removing a liner fastened to a mill shell by at least one liner bolt, the method including driving the at least one liner bolt through the mill shell until it becomes retained in the liner, whereby in a retained position, a head of the at least one liner bolt is exposed so as to project proud of the liner towards an interior of the mill; engaging a tool onto the at least one liner bolt; and, lifting the liner away from the mill shell using the tool to thereby enable the linter to be removed from the mill.

The method described by Russel requires the intervention of the operators for removing the nut and washer from the bolt retaining the liner in such a manner that once said nut is removed by the operator, it is pushed by means of the action of a hammer, also operated by the operator, which is performed outside the mill; once part of the bolt's body is located out of the hole of the liner, a tool is positioned for manipulating the liner, whereby Russel's method and system necessarily require direct intervention of the operators for changing a liner.

Application CL 2262-2015 (RUSSEL MINERAL EQUIPMENT PTY), filed on Aug. 23, 2015 and a member of the patent family of document WO2014/124491 with publication date Aug. 21, 2014, describes an apparatus for suspending and guiding a tool externally of a grinding mill, wherein said apparatus provides four or less degrees of freedom to said at least one tool, and wherein at least one of said degrees of freedom is an angular movement about the axis of rotation of said mill, wherein the apparatus comprises a first curved rail disposed outside and at least partially surrounding a part of the body of said mill, a first primary carriage installed for travel along said curved rail, and a first tool carriage coupled to the first primary carriage, wherein said at least one tool is installed in said tool carriage by means of a first slide mechanism for axial movement thereof. The objective of the configuration described by Russel is to enable a tool of a mill to be suspended and guided externally along a curved path, which may correspond to the curvature of the body of the mill.

As described in the state of the art, there is no existing, fully robot-assisted system and method which allows a mill liner of a mill to be changed which, by a simple command made remotely by an operator and performed by means of a processor comprised in a control system, successfully performs all the steps of changing said liner in an automated manner, without liner deformations, the location of the liner on the surface of the mill, the type, configuration, and size of liner to be changed, being influential factors.

Therefore, there is a need in the art to provide a robot-assisted system and method which, by simple remote command by means of a processor of a control system, allows changing the liner and/or shields in mills used in ore beneficiation processes, the configuration and operation thereof is completely automatic, without direct intervention of operators or staff in manipulating the tools needed to carry out said process, as well as in the elements comprised in the liner and the liner itself, so as to increase the changing process efficiency as well as to reduce and prevent risks for staff.

SUMMARY OF THE INVENTION

The object of the present invention relates to providing a system and method for changing a mill liner, the configuration thereof allowing the full automated and robotic manipulation of the method, by means of a remote command entered by an operator by means of a processor of a control system, in such a manner that the location, wear, and disposition of the liner to be changed in the mill casing does not condition system and method efficiency, as it has robotic manipulators which automatically manipulate a series of tools that allow liners to be removed and changed without direct intervention of staff, by providing robotic manipulators with a greater degree of freedom and/or flexibility in their movements for each of the automated tools involved in said changing process to operate in a correct position, providing a greater degree of certainty and efficacy to the method, therefore optimising the time that the mill is halted for maintenance, and also preventing the risks to which maintenance staff may be exposed.

The invention relates to an automatic robot-assisted system and method for changing liners, comprising at least one robotic manipulator having at least six degrees of freedom disposed outside of the mill adjacent to the outer surface, and at least one robotic manipulator having at least six degrees of freedom disposed inside the mill, a control system, and a series of automated tools which are operated by said robotic manipulators, in such a manner that said tools coupled to said robotic manipulators perform, in an automated manner, the loosening and removal of nuts on the outside of the mill, the loosening and removal of washers, the pushing of bolts, the gripping of bolts inside the mill, the removal of the liner, and the disposition of the liner for removal thereof from inside the mill, as well as the gripping of the bolts so that they are introduced automatically in holes of a new liner so as to automatically move this liner to the position commanded by the control system to dispose same on the surface of the mill from where the used liner was removed, the automatic disposition of a washer on the bolt on the outside of the mill, placing a nut on the bolt and applying torque thereto for fixing the new liner to the inner surface of the mill casing, and this is carried out in robot-assisted and automatic manner by the action of the robotic manipulator of each of the tools based on the command given remotely from the control system by an operator, such that the system and method allow collaborative action between the at least one robotic manipulator located inside and outside the mill for performing said changing of liners.

The configuration of the system and operation of the method for the robot-assisted and automatic changing of liners in a mill of the present invention allow said changing of liners to be performed with greater precision, because since the system is configured by means of robotic manipulators collaborating with one another in their actions both outside and inside the mill for carrying out each of the steps involved in changing by the command that is given through the programmer of the control system, which assumes variations that may arise in the positioning of the liner in mill, the method carried out is furthermore performed in a fully automatic manner, providing a greater degree of certainty and efficacy to the system and method, therefore optimising the time that the mill is halted for maintenance.

DESCRIPTION OF THE DRAWINGS

In order to help to better understand the features of the invention according to a preferred practical embodiment thereof, a set of drawings is attached as an integral part of the description in which the invention is depicted in an illustrative and non-limiting manner.

PREFERRED EMBODIMENT OF THE INVENTION

Figure 1:
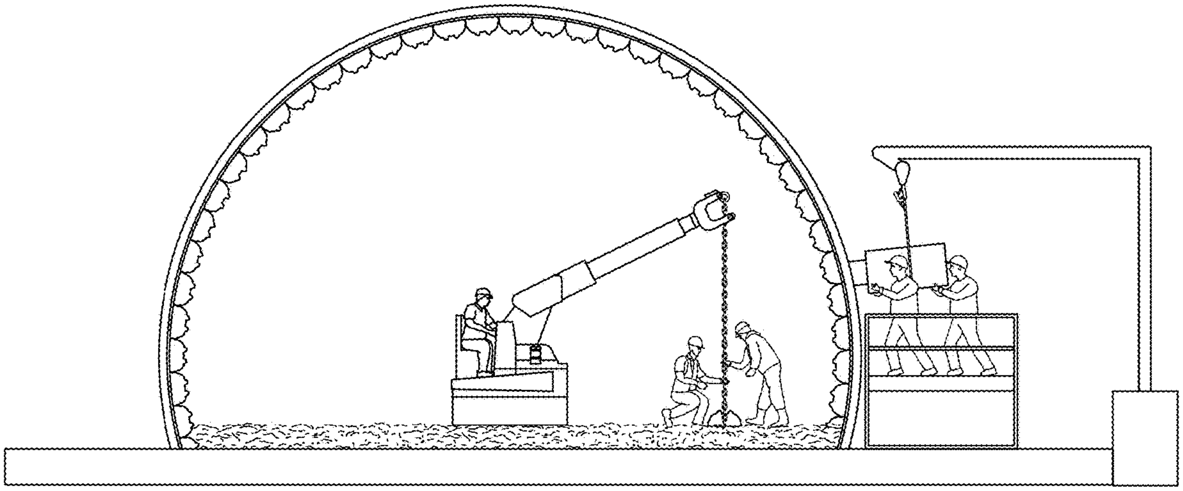
FIGURE 1 (Prior Art)
FIG. 1 corresponds to a general view of a system and method used in the prior art.
Figure 2:
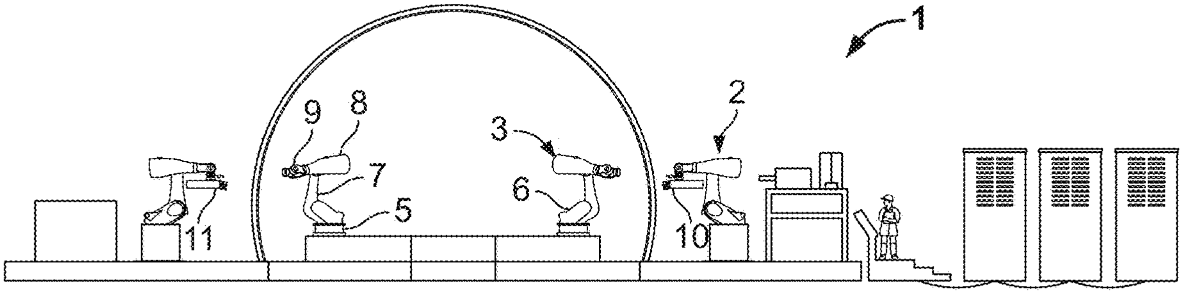
FIG. 2 corresponds to a general perspective view of the system for the automatic and robot-assisted changing of liner for mills according to the present invention.
Figure 3:
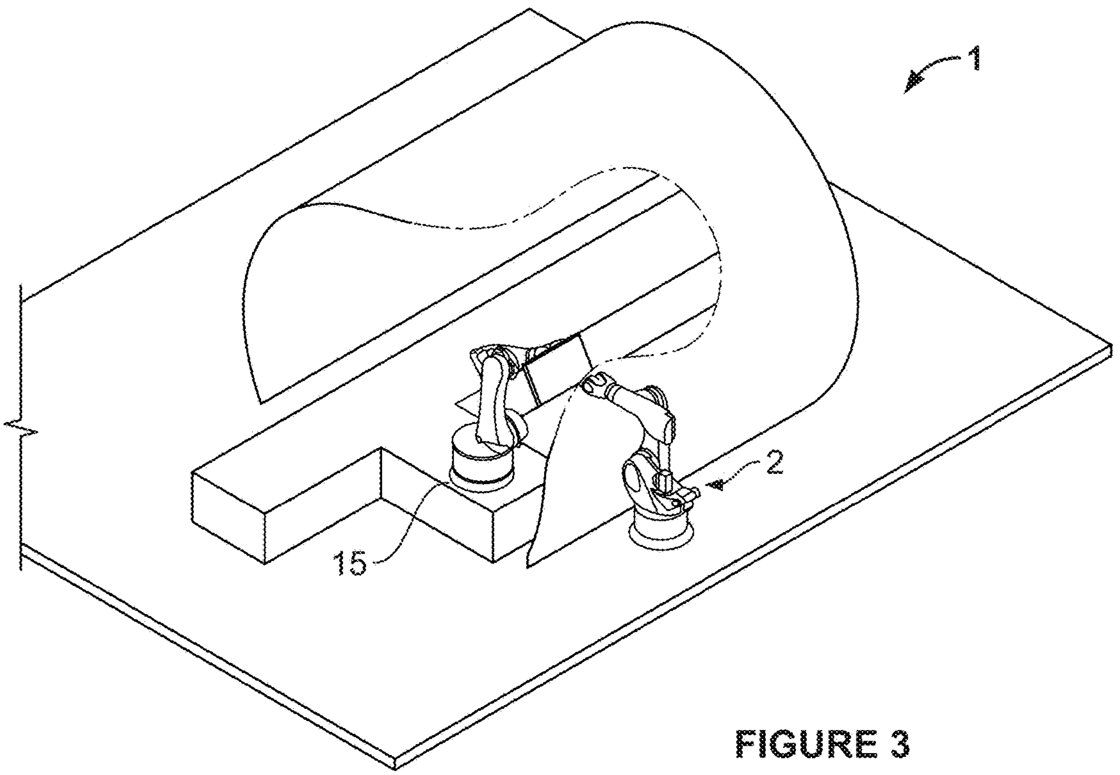
FIG. 3 corresponds to a perspective view of the system of the invention showing the collaborative action between the at least one robotic manipulator located inside and outside the mill in which the liner changing process is to be performed.
Figure 4:
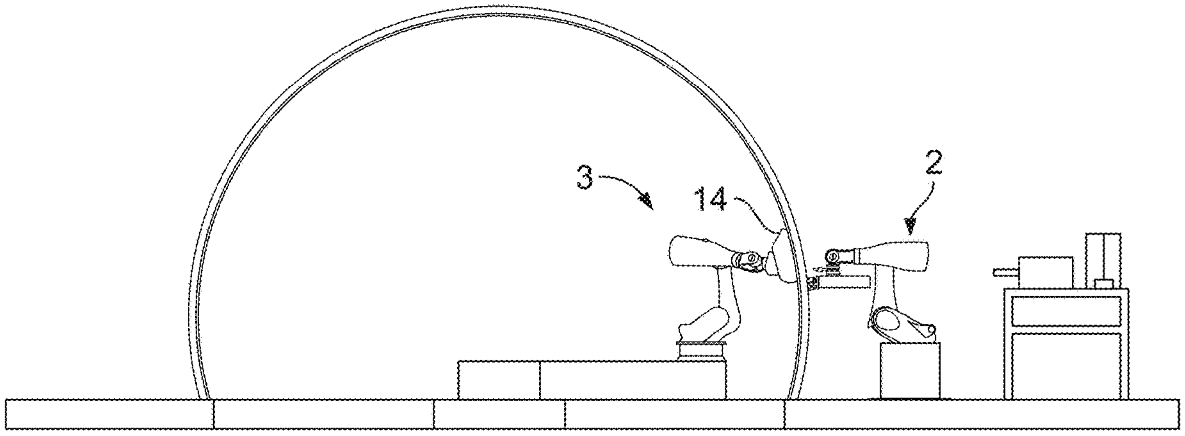
FIG. 4 corresponds to a front view of a cross section of FIG. 3.

The invention relates to a system and method for the robot-assisted and automatic changing of liners (1) from inside a mill, as schematically illustrated in FIG. 2, comprising at least one robotic manipulator (2) located outside of the mill, at least one robotic manipulator (3) located inside the mill, a control system, and a series of tools that are taken and manipulated automatically by said robotic manipulators (2, 3), such that the control system sends a command to operate the at least one external manipulator (2) and the at least one internal manipulator (3) to carry out the steps of changing at least one liner of the mill in a coordinated manner with collaboration between at least the two robotic manipulators (see FIGS. 2 to 4)

Figure 5:
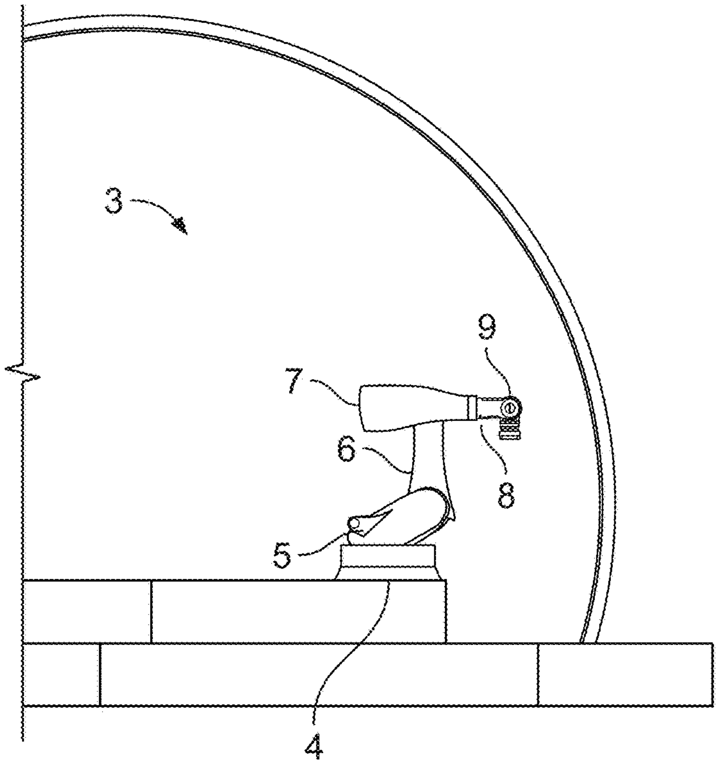
FIG. 5 corresponds to a view of a detail of the at least one robotic manipulator preferably used inside a mill in the system of the present invention.
Figure 6:
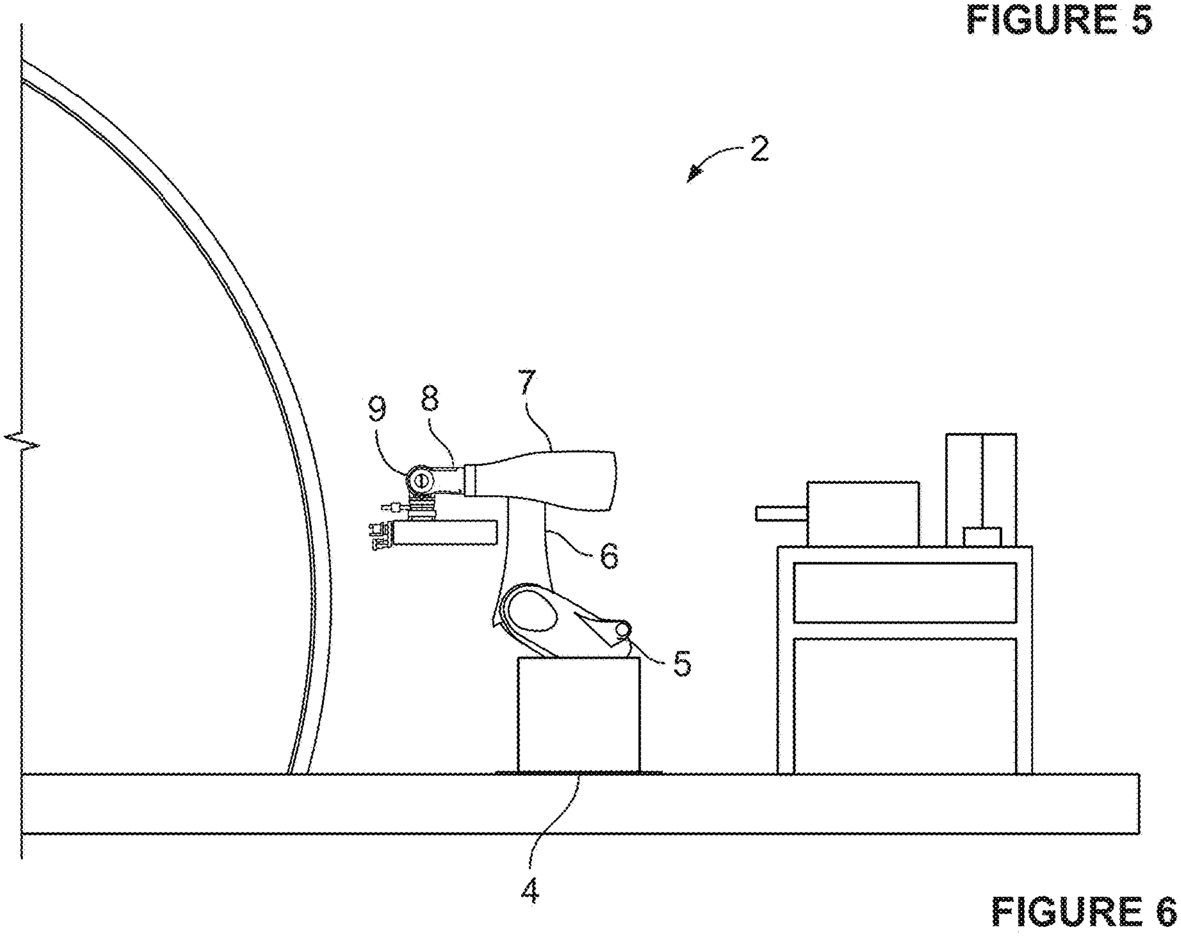
FIG. 6 corresponds to a view of a detail of the at least one robotic manipulator preferably used outside of a mill in the system of the present invention.
Figure 7:
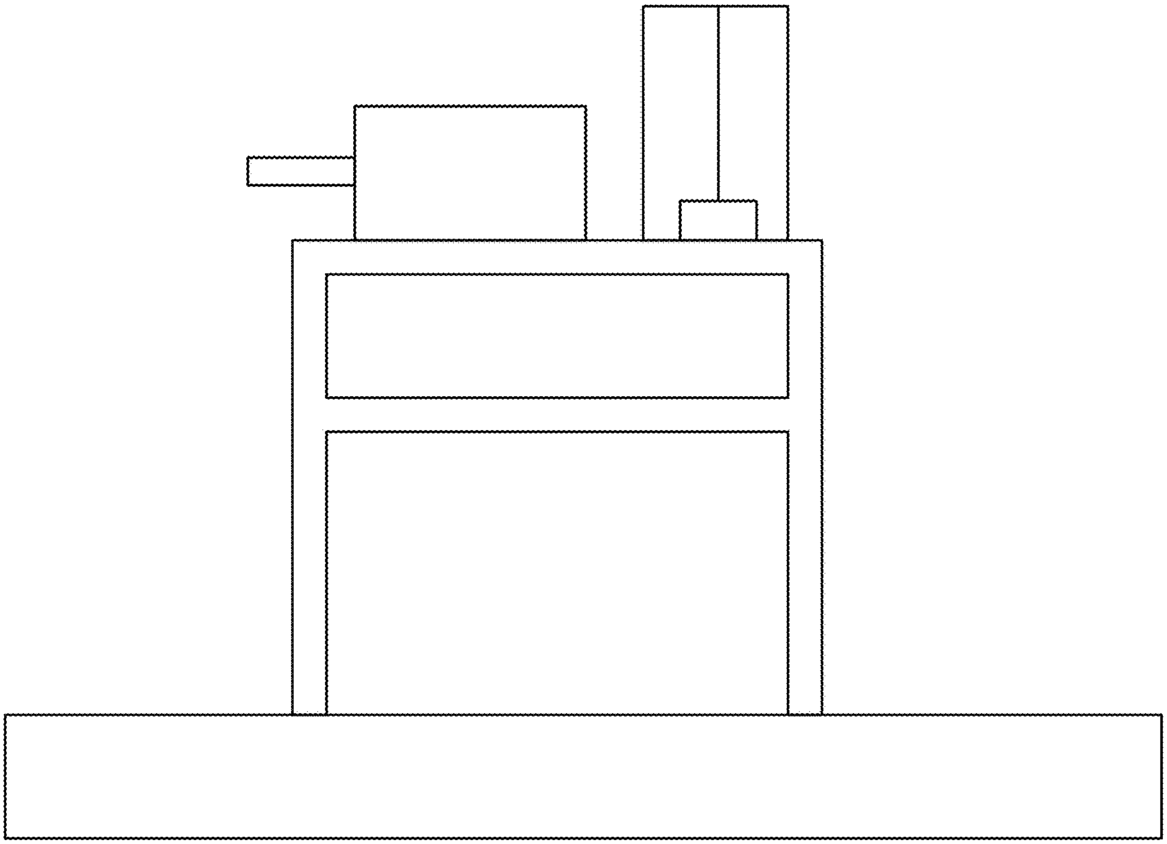
FIG. 7 corresponds to a view of the tools which are used by the at least one interior and/or exterior robotic manipulator of the system of the present invention.
Figure 10:
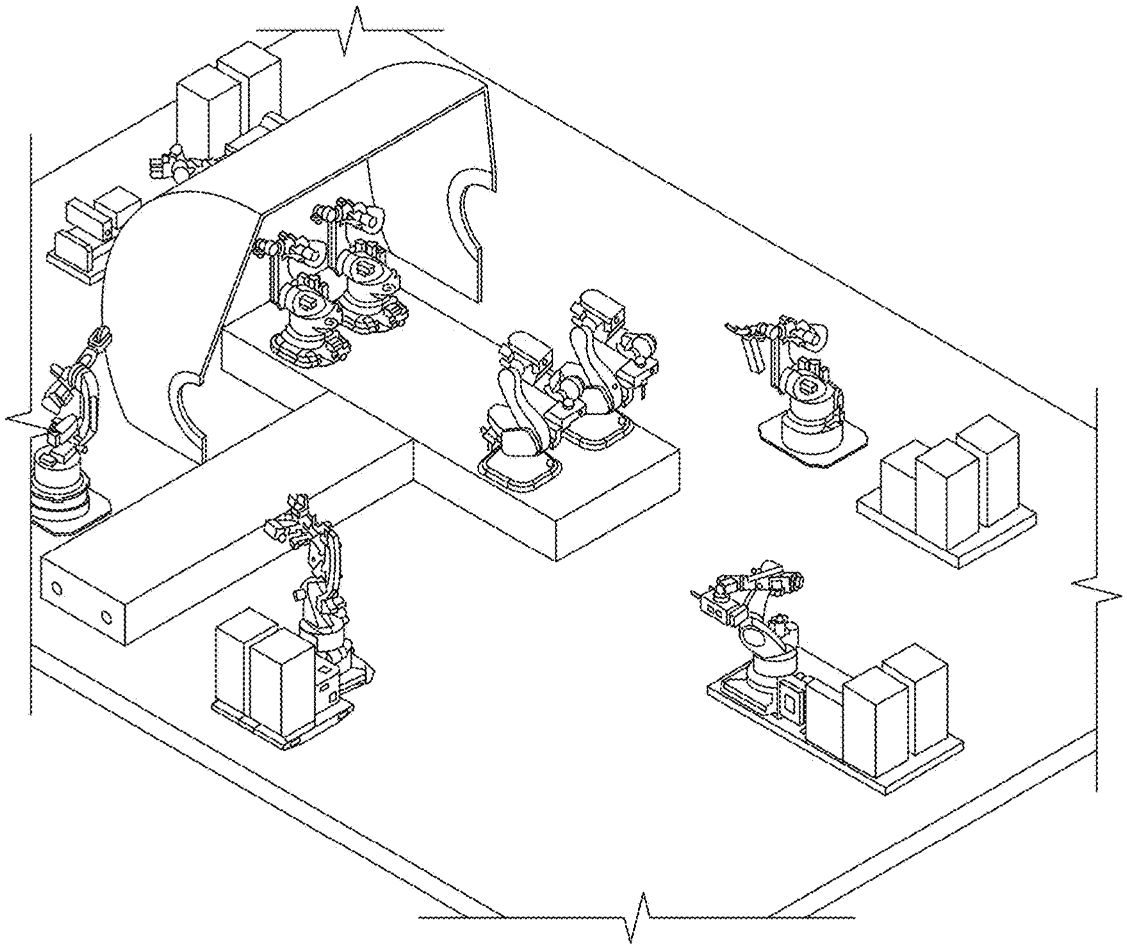
FIG. 10 shows an isometric view of the system of the invention implemented in a series of activities which can be performed at the same time during mill maintenance.
Figure 10A:
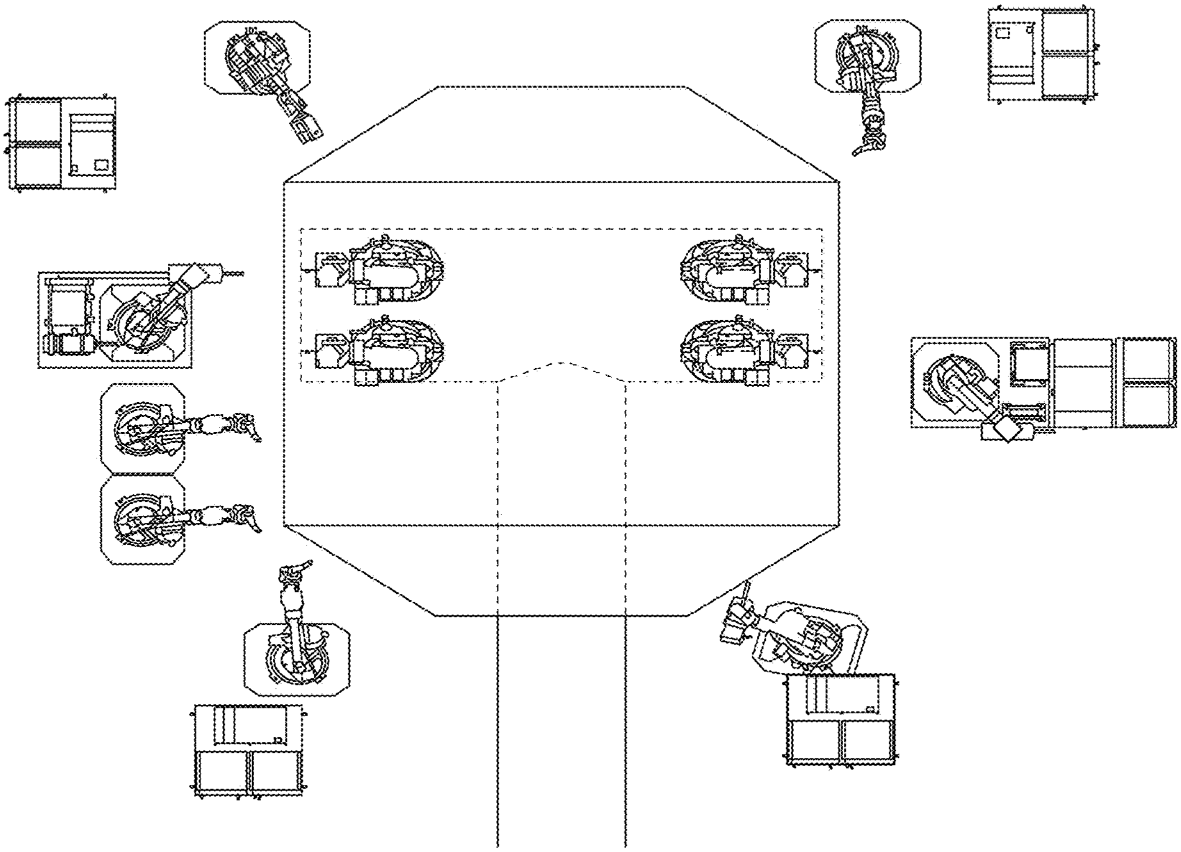
FIG. 10*a* corresponds to a top plan view of the depiction of FIG. 10.

As illustrated by way of example in FIGS. 5 and 6, the at least one robotic manipulator (2, 3) comprises a base (4) which is fixed to the mounting surface (5), where there are mounted on said base (4) a rotary column (6), an oscillating arm (7), an arm (8), and a wrist (9) on which at least one tool is mounted (see FIG. 7) from a tool carrier, which is selected from a device for removing and installing single nuts (10), or a double torquing and detorquing device (11), and/or a device (12) taking, installing, and removing vulcanized cup washers, and/or a device (13) for pushing and/or knocking out bolts, and a tool (14) for taking, fixing, and moving bolts and/or manipulating the liners, which allow carrying out in a robotic and automatic manner the steps of a) giving a command to change a specific liner through the control system; b) loosening and removing the nuts; b) loosening and removing the vulcanized cup washers; c) disposing the liner manipulator next to the liner to be removed; d) pushing the bolts from outside of the mill; e) gripping the bolts with the manipulator; f) removing the liner from the inner surface of the mill; g) placing it so as to be taken out from inside the mill; h) taking at least one bolt with the liner manipulator; i) introducing the bolt in the hole of the liner to be changed; j) moving the liner to the initial removal location of the changed liner; k) placing the washers back on the bolts of the new liner from outside of the mill; l) placing the nuts on the bolts and applying torque thereto until firmly fixing the liner against the inner surface of the mill casing; m) repeating the preceding sequence to change another liner, wherein the control system allows the command to be sent remotely to robotic manipulators so that by means of the indication of the location, disposition, shape, size, and configuration of the liner to be changed, the different steps described above are carried out automatically with the different tools taken by said robotic manipulators and fixed through the wrist, in such a manner that each tool further comprises sensors which allow verifying correct operation of each tool based on the command given by the control system in a coordinated manner with collaboration between at least the two robotic manipulators, so as to correctly perform each operation, which is illustrated by way of example through FIGS. 10 and 10*a*.

The rotary column (6), which is the base of at least one robotic manipulator (2, 3) (see FIGS. 5 and 6), allows the entire robotic manipulator to be rotated to different positions so as to allow reaching the liners fixed in different positions on the inner cover of the mill, and the first and second oscillating arms (7, 8) allow moving the tools to the different working points of the mill. The wrist (9) allows rotating and/or orienting the fixed tool based on the location and/or disposition of the liner, bolt, nut, and/or washer based on the information that the operating system delivers to the robotic manipulator (2, 3). The robotic manipulator further comprises an electrical installation system and a weight compensator, in such a manner that said robotic manipulator is formed from at least 6 axes or degrees of freedom.

The mounting surface (4), which can be seen by way of example in FIGS. 6, 10, and 10*a*, can be a simple mounting surface, such as a fixing support or base in which there can be disposed different accessories, such as a support for the various tools, containers for placing nuts and/or washers, supports for bolts, support for liners. In one embodiment of the invention, which can be seen by way of example in FIG. 3, the mounting surface (4) may comprise a pivoting beam (15) for fixing the at least one robotic manipulator (2, 3), allowing the provision of an additional axis of rotation which, when operating, allows angular movement of the pivoting beam of about 180° degrees by means of the actuation of at least one hydraulic cylinder.

Figure 8:
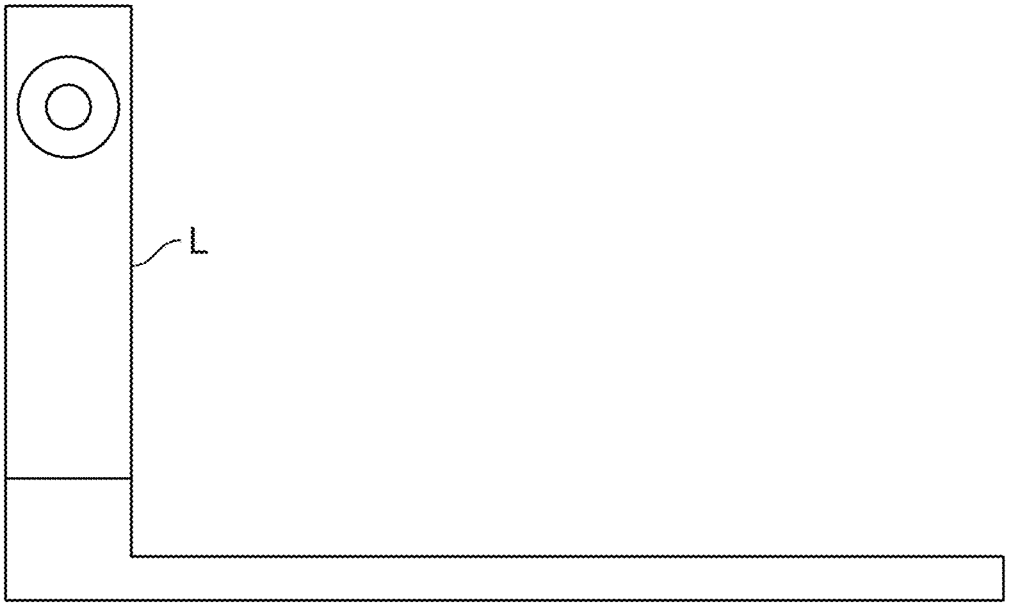
FIG. 8 corresponds to a detail of the machine vision means used in the system of the present invention.

The at least one robotic manipulator (2, 3) may comprise detection means for detecting the position of the liners, bolt, nut, and/or washer configured by at least one machine vision system, FIG. 8, which is based on machine vision techniques by means of using laser triangulation cameras (L) through which the mantle of the inner surface of the mill is scanned to determine the position in which the liner must be inserted so as to verify and correct the possible minor deviations that the disposition commanded by the system control may experience.

The machine vision system comprises a laser triangulation camera, the acquisition system of which is based on laser triangulation, acquiring spatial information of its surroundings, wherein said acquired information is processed through a computer, further comprising a PLC integrating the cameras and computer thereof with the control system for controlling the positioning of the pivoting beam (15) and the robotic manipulator (2, 3) to achieve the specific position captured by the cameras, wherein angular orientation and position data passes through the PLC for transmission to the robotic manipulator and for controlling same.

In this manner, at least one robotic manipulator (2, 3) system for manipulating the liners therefore comprises a configuration of at least 6 degrees of freedom, i.e., it has at least 6 axes or attachments that can pivot with respect to one another, allowing each of the elements to perform a movement that is different or that is in different positions or directions with respect to the other, allowing the tool attached to the robotic manipulator (2, 3) to be oriented depending on the point where the liner is taken as commanded from the control system based on liner type, location, disposition, and configuration, the tool to be moved to different working points, and/or allowing the entire robotic manipulator to be rotated to different positions inside and/or outside of the mill to access the different positions where a changing of liners is required.

Figure 9:
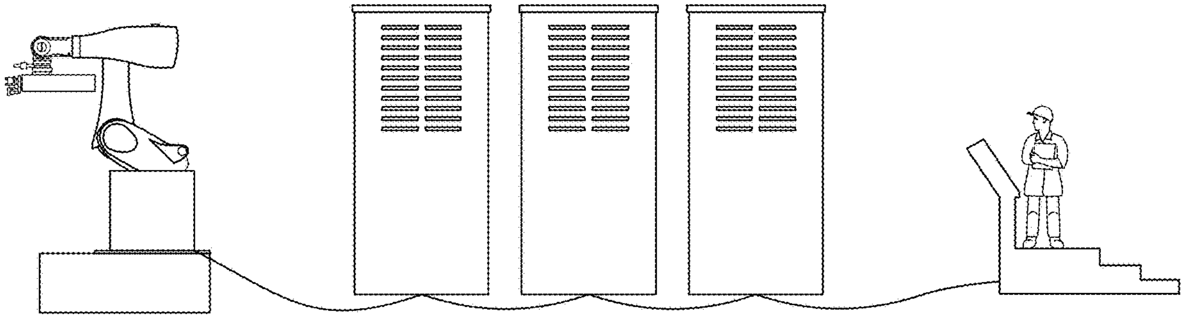
FIG. 9 shows a detail of the control system comprised in the system of the invention.

In FIG. 9, the control system allows operating and controlling the system for changing liners of the present invention, having the function of providing power and controlling the system, in addition to having controls for commanding and monitoring same. The control system has at least one switchgear or SG, control panel or CP, manipulator control cabinets, position detection panel PDP and human-machine interface or HMI, hydraulic installation, inductive sensors, encoder, among other control means.

The switchgear SG corresponds to the cabinet containing elements for protection against surges, protections for the electrical equipment of the control cabinet, local cabinet for controlling the robotic manipulator, equipment such as the robotic manipulator itself and the HMI (human machine interface) operator panel. It also contains the single-pole bar for distributing power to the different elements and/or cabinets. It has a main single-phase thermomagnetic disconnector for opening or closing the circuit for introducing electric power, in addition to pilot light indicators.

Tool control cabinets mainly contain the drives necessary for actuating each servomotor of the robotic manipulators and are connected to the general CP. One or more control cabinets is required for the functionality of the apparatus.

The CP corresponds to a panel for storing components in charge of performing system control, the base of this cabinet being its main controller, internal memory, and management of a digital input module.

The position detection panel PDP contains a computer connecting to and receiving signals from the machine vision which captures the internal position of liners with high precision, with the computer processing the data and sending the signals to the CP in order to position the robotic manipulators, with the routines thereof.

Additionally, it presents a safety architecture formed by a controller which monitors all the safety signals of the apparatus, emergency stop buttons, and excessive torques. The emergency stop buttons are mushroom-type stop buttons and are located in the operation panel and on the side of the accesses. The actuation of emergency stop buttons causes the apparatus to be halted. The re-establishment of an emergency stop button alone does not leave the apparatus in conditions to start operating again; inspection of the emergency stop button by the operator is required at all times. The reinstatement of the emergency stop buttons is performed in the region where the latter was activated, but inspection of the emergency stop buttons is performed through the operating display.

In a preferred but non-limiting embodiment, the method for changing liners according to the invention comprises locating at least one robotic manipulator (2, 3) outside of and inside the mill adjacent to the inner and outer surface of the shell thereof, entering the command to change through the control system by indicating and identifying the liner to be changed, wherein each of the liners comprised in the mill is initially identified in the programmer of the control system, in terms of the location, disposition, shape, and configuration thereof, in such a manner as to deliver the information and command in a precise and accurate manner to at least one robotic manipulator (2, 3) in order to carry out the different operating steps or sequence in order to perform a coordinated and collaborative changing of said identified liner between at least the two robotic manipulators (2, 3). The changing sequence is then started, wherein the robotic manipulator (3) located on the outside takes torquing tool to be disposed in the location of the nuts of the identified liner to be changed, wherein said sequence further comprises locating and aligning a bolt gripping tool and liner manipulator which is taken by the robotic manipulator (2) located inside the mill, such that said tool is aligned at the liner outlet position; the torquing tool of the robotic manipulator located outside of the mill is operated to perform removal of the nuts; the tool is then changed to a washer manipulation tool which allows washers to be removed from the bolts, wherein said operations can be performed by at least another robotic arm located outside of the mill; a device for pushing and/or knocking out bolts, which can be disposed in another robotic manipulator, is then operated in such a manner that said tool allows the bolts to be pushed into the mill, which bolts are secured and taken by the liner manipulator, disposed in at least one arm robotic (2) located inside the mill, thereby gripping the bolts in such a manner as to exert a force that allows the liner to be released from the shell of the mill, placing the liner at an angle which allows to prevent it from falling; the liner is moved to a feeding device which removes it from the area together with the bolts.

To install the new liner, the robotic manipulator (2) disposed inside the mill with the liner manipulation tool fixed thereto is moved to take the bolts from a bolt feeder; with the bolts in place, they are moved to the liner feeding area, fitting the bolts through the holes of the liner, taking the liner at an angle such that it is prevented from falling from the tool; the robotic manipulator is moved to the position in which the used liner was removed in such a manner as to arrange the liner in said position such that the bolts are introduced through the holes of the shell, where they are exposed so that through the exterior robotic manipulator, which has a washer manipulation tool, a washer is introduced on the bolt; subsequently, by means of a torquing tool disposed in a robotic manipulator located on the outside, torque is applied to a nut and said nut is fixed on the bolt, thereby fixing the new liner to the inner surface of the shell of the mill. This method did not involve the use of staff, only the robotic manipulators (2, 3) with their respective tools in a coordinated manner with collaboration.

With the configuration of the present invention, the entire operation for changing a liner can be performed in a robotic and automated manner, in a coordinated manner with collaboration, thereby preventing the staff from having to be present inside and outside of the mill to perform the operation, and providing the robotic manipulator with the configuration needed to improve the manipulation operation by having a greater degree of freedom and/or flexibility in its movements, providing the method with a greater degree of certainty and efficacy with respect to the equipment used in the art.

Although the configuration of the system for changing liners of a mill used for ore grinding herein described constitutes a preferred inclusion of this invention, it must be understood that the invention is not limited to this specific form of the system for changing the liner, given that changes can be made therein without departing from the scope of the invention defined in the attached claims.

The invention claimed is:

1. A system for robotic and automated, coordinated, collaborative changing of mill liners, comprising:

at least one robotic manipulator located outside of a mill, adjacent to an outer surface of the mill;

at least one robotic manipulator located inside the mill, adjacent to an inner surface of the mill and in contact with a base surface devoid of contact with the mill;

a control system; and a plurality of tools, each of said tools automatically manipulated by at least one of said at least one manipulator located outside of the mill and said at least one robotic manipulator located inside the mill based on said control system sending at least one command to at least one of said at least one manipulator located outside of the mill and said at least one robotic manipulator located inside the mill to carry out the steps of changing at least one of the liners of the mill in a coordinated manner with collaboration between the at least one manipulator located outside of the mill and said at least one robotic manipulator located inside the mill.

2. The system of claim 1, wherein at least one of said robotic manipulators includes a rotary column, an oscillating arm, an arm.

3. The system of claim 1, further comprising a device for at least one of:

removing and installing single nuts;

double torquing and detorquing;

taking, installing, and removing vulcanized cup washers for pushing or knocking out bolts;

taking, fixing, and moving bolts; or manipulating liners.

4. The system of claim 2, wherein said base comprises a pivoting beam for fixing the at least one robotic manipulator, and allowing the provision of a further rotating axis which, when operating, allows angular movement of the pivoting beam of about 180° degrees.

5. The system of claim 2, wherein said base includes a fixing support on which a plurality of accessories are disposed including one or more tools, containers for placing nuts or washers, supports for bolts, or a support for liners.

6. The system of claim 1, wherein at least one robotic manipulator further comprises an electrical installation system and a weight compensator, wherein said at least one robotic manipulator is formed from at least 6 axes or degrees of freedom.

7. The system of claim 1, wherein said control system comprises at least one switchgear, control panel, manipulator control cabinet, position detection panel and human-machine interface, hydraulic installation, inductive sensor, or encoder.

8. A method for a robotic manipulator system to automatedly change a liner in a mill, comprising the steps of:

locating at least one robotic manipulator outside of and at least one inside the mill adjacent to the inner and outer surface of the shell of said mill, receiving at least one command from a control system indicating and identifying the liner to be changed, wherein each of the liners in the mill is initially identified in the control system in terms of the location, disposition, shape, and configuration, wherein said command includes precise and accurate information directed to at least one robotic manipulator to carry out different operating steps or sequence to perform a coordinated and collaborative actions of each identified liner between at least the two robotic manipulators, and wherein the coordinated and collaborative actions between said robotic manipulators includes the steps of loosening and removing nuts, loosening and removing vulcanized cup washers, arranging a liner manipulator next to the liner to be removed, obtaining bolts from the outside of the mill, gripping the bolts with a robotic manipulator, removing the liner from an inner surface of the mill, and moving any replaced liners to outside the mill.

9. A method for a robotic manipulator disposed in a mill to replace a removed liner with a liner manipulation tool fixed thereto comprising the steps of:

taking bolts from a bolt feeder with the bolts in place, to a liner feeding area, fitting the bolts through holes of a liner;

taking the liner at an angle such that it is prevented from falling from the tool;

said robotic manipulator moving to a position in which a used liner was removed in such a manner as to arrange the liner in said position such that the bolts are introduced through the holes of a mill shell, where said bolts are exposed through the exterior robotic manipulator;

wherein said manipulator has a washer manipulation tool, said manipulator receives a washer and places said washer on a bolt, using a torquing tool disposed on said manipulator's exterior, applying torque to a nut, fixing said nut on the bolt, and fixing a new liner to an inner surface of the shell of the mill.

* * * * *